United States Patent [19]

Higdon

[11] Patent Number: 4,470,128
[45] Date of Patent: Sep. 4, 1984

[54] CONTROL ARRANGEMENT FOR MAGNETIC BUBBLE MEMORIES

[75] Inventor: John M. Higdon, Lexington, Ky.

[73] Assignee: International Business Machines Corporation, Armonk, N.Y.

[21] Appl. No.: 306,792

[22] Filed: Sep. 29, 1981

[51] Int. Cl.³ .............................................. G11C 19/08
[52] U.S. Cl. ........................................ 364/900; 365/15
[58] Field of Search ... 364/200 MS File, 900 MS File; 365/15

[56] References Cited

U.S. PATENT DOCUMENTS

| | | | |
|---|---|---|---|
| 4,128,891 | 12/1978 | Lin et al. | 364/900 |
| 4,159,412 | 6/1979 | Naden et al. | 365/15 |
| 4,161,788 | 7/1979 | Rosenblum | 364/900 |
| 4,183,090 | 1/1980 | Furukawa et al. | 364/900 |
| 4,221,003 | 9/1980 | Chang et al. | 364/900 |
| 4,225,941 | 9/1980 | Moran | 364/900 |
| 4,237,544 | 12/1980 | Bonyaard | 364/900 |

OTHER PUBLICATIONS

"Bubble Memories Impact and Opportunity", Anderson/Bogart, Aug. 1977, Chapter 4, pp. 14–20.

*Primary Examiner*—Gareth D. Shaw
*Assistant Examiner*—Daniel K. Dorsey
*Attorney, Agent, or Firm*—John A. Brady; George E. Grosser

[57] ABSTRACT

An arrangement for incorporating a magnetic bubble memory (MBM) into a system having a system processor and a direct access storage (RAM) utilizes digital command words that represent basic MBM data operations. The processor controls the MBM indirectly by assembling strings of command words in RAM which are transferred to a control interface individually by a direct memory access device. The interface then translates the command words into a set of control signals that are applied to the drive system of the MBM. Each string of command words preferably corresponds to a complete memory read or write operation or a major portion thereof.

10 Claims, 9 Drawing Figures

CONTROL ARRANGEMENT FOR MAGNETIC BUBBLE MEMORIES

BACKGROUND OF THE INVENTION

1. Technical Area

The invention relates to data storage devices such as magnetic bubble memories that do not allow direct access to a desired stored word and, more specifically, to a control arrangement for coordinating data operations respective of such devices.

2. Art Discussion

Control arrangements for data storage devices that do not provide for direct word access serve in coordinating the multiple basic storage operations that are involved in executing the data storage requests initiated by an associated system. For example, with a magnetic bubble storage device, a request for the data word at a specified storage address typically involves a series of basic operations to advance, replicate and detect the stored information that is to be accessed. Circulation of stored information in minor loops is typically required to advance data to a site where a replication occurs to place corresponding data on a channel at which a read operation may be performed. Finally, the read operation is effected when the data is shifted to a detection site on the channel.

To provide for system interaction with such a storage device that requires involved sequences of operation customized to each request, a controller is often used which includes discrete logic designed specifically for supplying control signals that serve to coordinate basic storage maneuvers.

A further approach uses a microprocessor to control the basic operations but a high performance microprocessor typically becomes necessary to generate the control signals at rates sufficient to utilize the storage efficiently. Furthermore, the microprocessor usually is dedicated to the single purpose of storage control.

SUMMARY OF THE INVENTION

In a system that includes a main processor, a direct access, read/write storage (RAM) and a magnetic bubble memory (MBM), the processor translates each gross storage operation with the MBM (e.g. a word store or word retrieve operation) to a customized string of special digital command words that serve to identify basic MBM bubble manuevers (e.g. generate, sway, advance, replicate, detect). The command words of a string are stored in a section of the RAM.

A direct memory access (DMA) device is then caused by the processor to transfer the command word string to an interface for the MBM that latches the command words one at a time and, effectively, decodes them to provide control signals to basic operation activating apparatus associated with the MBM.

By so using strings of coded commands to permit indirect processor control of storage operations, the processor can customize detailed sequences of basic operations while interacting at high speed with a direct-access storage and then assume normal processing functions while a DMA device coordinates the transfer of the coded commands to an interface to the storage. The interface then latches the commands individually and interprets them to issue individual control signals to the activating apparatus of the MBM.

In a preferred implementation, the processor also provides for bad data loops by initially reading redundancy information from a special loop having independent replicaton structures and then characterizing all other bits read as good or bad, in accordance with a stored table of the bad loop data located in RAM, using one bit of the command word.

BRIEF DESCRIPTION OF THE DRAWING

A presently preferred implementation of the invention will be described below in detail with reference to the drawing wherein.

DETAILED DESCRIPTION REGARDING THE INVENTION

Figure 1:
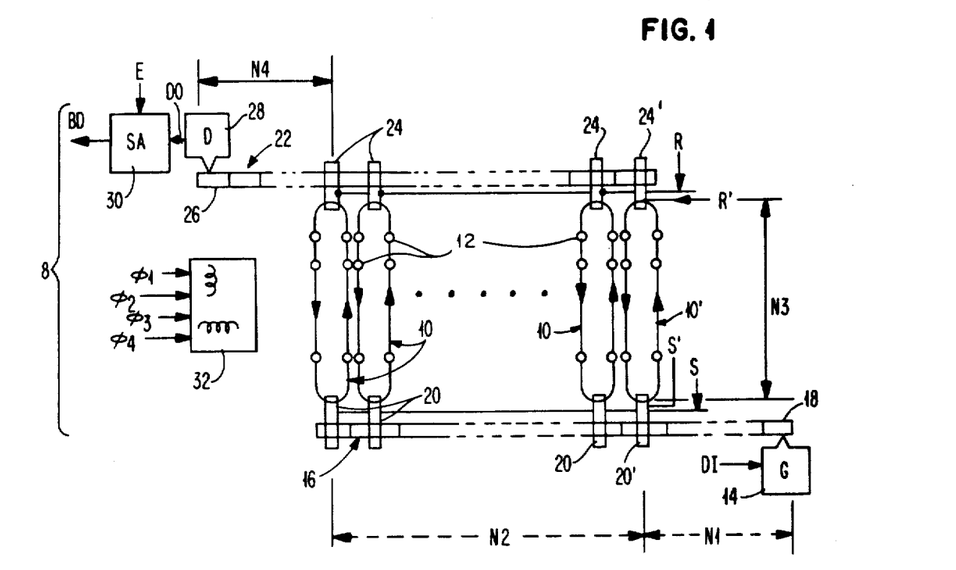
FIG. 1 is a diagram of a magnetic bubble memory suitable for use in practicing the invention.

Referring to FIG. 1, a typical magnetic bubble memory 8 includes one or more paths such as the data loops 10 in which individual bubbles 12 may advance incrementally while retaining a stream position. The state of a stored information bit is indicated by the presence or absence of a bubble 12 at a particular elemental stream position for a loop 10 and a special loop 10' is provided that includes information identifying bad data loops and reference position (or element) for the streams of bubbles on the loops 10 and 10'. The reference position permits relative addressing to be recognized on the bubble stream. The bubbles 12 are generated in response to an input data signal DI at a generator structure 14 located along a write path or channel 16 at a generation or write site 18. The bubbles are advanced a fixed number (N1) of locations along the channel 16 to arrive at fixed number (N2) of swap site locations adjacent the loops 10 and 10'. At the N2 locations, a transfer of bubbles 12 to loops 10 is effected in response to a signal S by "swap" structures 20 located at the respective loops 10. A separate sway structure 20' is provided to allow transfers of data to the loop 10' under the control of a signal S'. Generally, however, the loop 10' would be loaded with bad loop information and reference position information as a preliminary operation and left unchanged thereafter. The bad loop information allows the use of devices that have some loop defects by providing for avoidance of defective loops.

With the loops 10 and 10', there are N3 locations on either side (half loop) over which bubbles 12 may be advanced. Only one direction of bubble shifting occurs in the loops 10 and 10' (see arrows). Replications from the loops 10 to provide corresponding bubbles 12 in a read channel 22 are effected by replicate structures 24

(located at replicate sites or locations of the loops 10) in response to the signal R. A transfer of bad data loop information from the loop 10' to the read channel 22 may be effected at the separate replicate structure 24' in response to the signal R'. A fixed number of locations (N4) is provided beyond the loops 10 on the read channel 22 to arrive at a read site 26 at which a bubble detector 28 is located. The signal produced by the bubble detector 28 is amplified by a sense amplifier 30 which is enabled by a signal E and produces an output signal BD indicative of stored information.

Operation of the magnetic bubble memory 8 involves incremental circulation of the bubble streams in the loops 10 and on the channels 16 and 22 with increments of advance being stimulated by a set of coils 32 activated by four distinct phase signals ($\phi_1$, $\phi_2$, $\phi_3$ $\phi_4$). Storage addresses may be recognized by establishing reference points on the bubble streams for the loops 10 and these sites may be identified, fir example, using a special code, (e.g. a long string of empty bubble stream positions followed by one or more bubbles) included on the loop 10' along with the bad loop information.

While a particular magnetic bubble memory configuration has been described, the invention can be used with other configurations and a detailed discussion of various configurations may be found in the article Magnetic Bubbles—An Emerging New Memory Technology, by Bobeck, et al, Proceedings of the IEEE, August 1975, pages 1176-1194.

Figure 2:
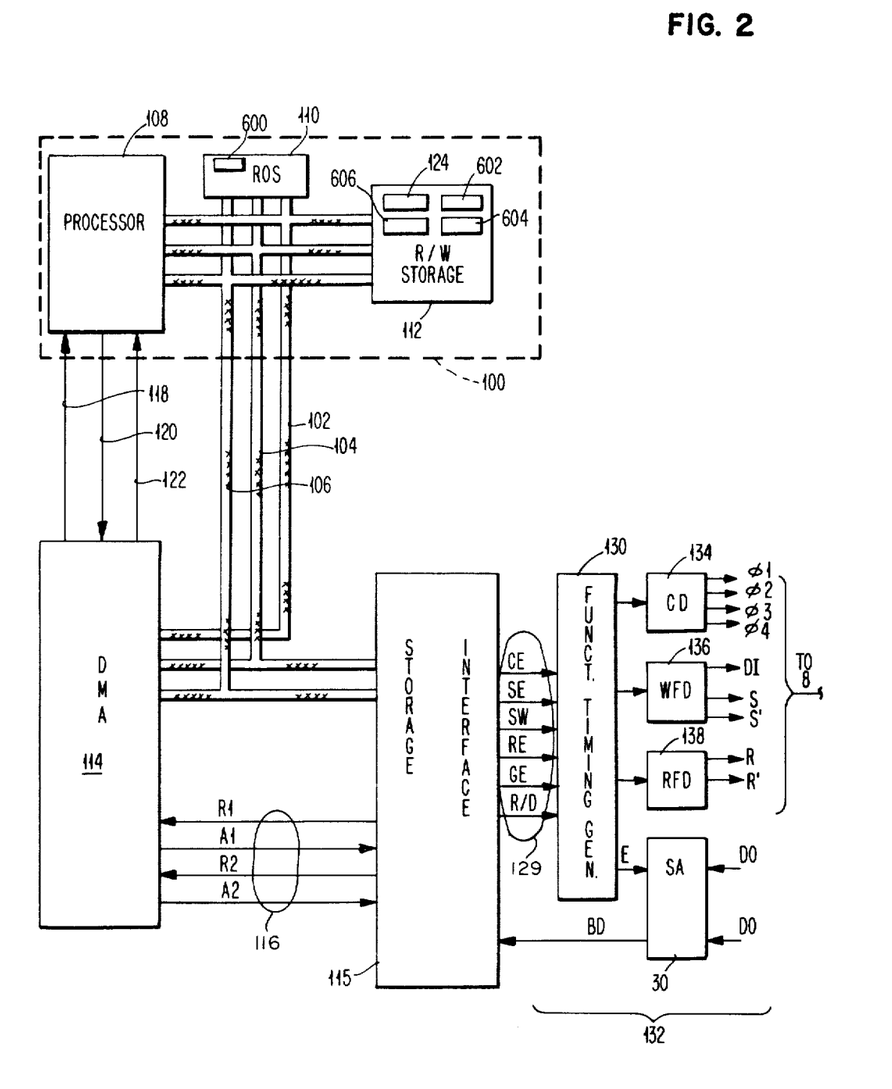
FIG. 2 is a diagram indicating a processor system for utilizing a magnetic bubble memory in accordance with the invention.

Referring to FIG. 2, a computer system 100 is connected to define address, data and control buses 102, 104 and 106, respectively, for transfer of signals. The busses 102, 104 and 106 carry signals between a processor 108, a read-only-storage (ROS) 110 and a direct-access read/write storage (RAM) 112 as is a well known configuration for digital signal processing. According to the invention, a direct memory access (DMA) device 114 is connected to the busses 102, 104 and 106 and interacts with a storage interface 115 using request and acknowledge lines 116 as is discussed in more detail below. The DMA device 114 may take various forms and serves to respond to a request from the processor 108 to produce a sequence of data addresses on the address bus 102 along with data transfer control signals on the control bus 106 that permit direct data transfers to occur over the data bus 104. The processor 108 preferably transfers to the DMA device 114 a start address code, a code indicating the number of records to be transferred, identification codes for the devices selected to participate in the transfer, and a control signal defining the direction of transfer. Time on the busses 102, 104 and 106 for individual command word transfers is allocated to the DMA 114 by the processor 108 using hold and hold acknowledge lines 118 and 120 extending therebetween and a completion of transfers for a string of command words is signaled over an interrupt line 122.

As will be discussed in more detail below, the processor 108 loads coded words representing basic storage operation commands into a command section 124 of the RAM 112 and these commands are transferred, preferably individually, to the storage interface 115 as coordinated by request and acknowledge signals R1 and A1 transmitted over the lines 116. The storage interface 115 according to the invention serves to latch command words transmitted from the RAM 112 and applies corresponding logic signals on line 129 to a function timing generator 130 for initiating basic storage operations.

The function timing generator 130 is a part of means 132 for activating the magnetic bubble memory 8 to perform basic storage operations and provides timing signals to a coil driver 134, a write function driver 136, a read function driver 138 and the sense amplifier 30.

Phase signals $\phi_1$-$\phi_4$ for the coils 32 (see also FIG. 1) are generated by the coil driver 134 to cause advance of the bubbles 12. The write function driver 136 serves to apply the signal DI to the generator structure 14 when a bubble is requested to be formed and produces signals S and S' to cause swapping of bubbles from the write channel 16 to adjacent write sites on the loops 10 and to the loop 10', respectively. When reading of stored information is to be performed, the data of interest is advanced on the loops 10 to a read site at the replicate structures 24 or 24'. A replication of the loop states (bubble or no bubble) is effected onto the read channel 22 when the read function generator 138 applies a signal R or R' to the replicate structures 24 or 24', respectively.

To permit reading of data from the detector 28, an enable signal E is sent to the sense amplifier 30. The signal E enables the sense amplifier 30 to response to a characteristic (e.g. impedance) of detector 28 and produce the signal BD, indicating the state of the accessed data. The interface 115 further serves to receive the signal BD and cooperates with the DMA 114 to write requested data as coordinated by a second DMA channel and the request and acknowledge signals R2 and A2.

The function timing generator 130 is a device known in the art and provides timed signals within the framework of an operating period (e.g. a ten microsecond operating period). Specific timing requirements are dictated by the magnetic bubble memory and one compatable family of devices suitable for practicing the invention includes the Texas Instruments, Inc. TIB0500 magnetic bubble memory module which may be used with function timing generator TI74LS772, sense amplifier 75282, read function driver 75393, write function driver 75392 and coil drivers 75388a.

Figure 3:
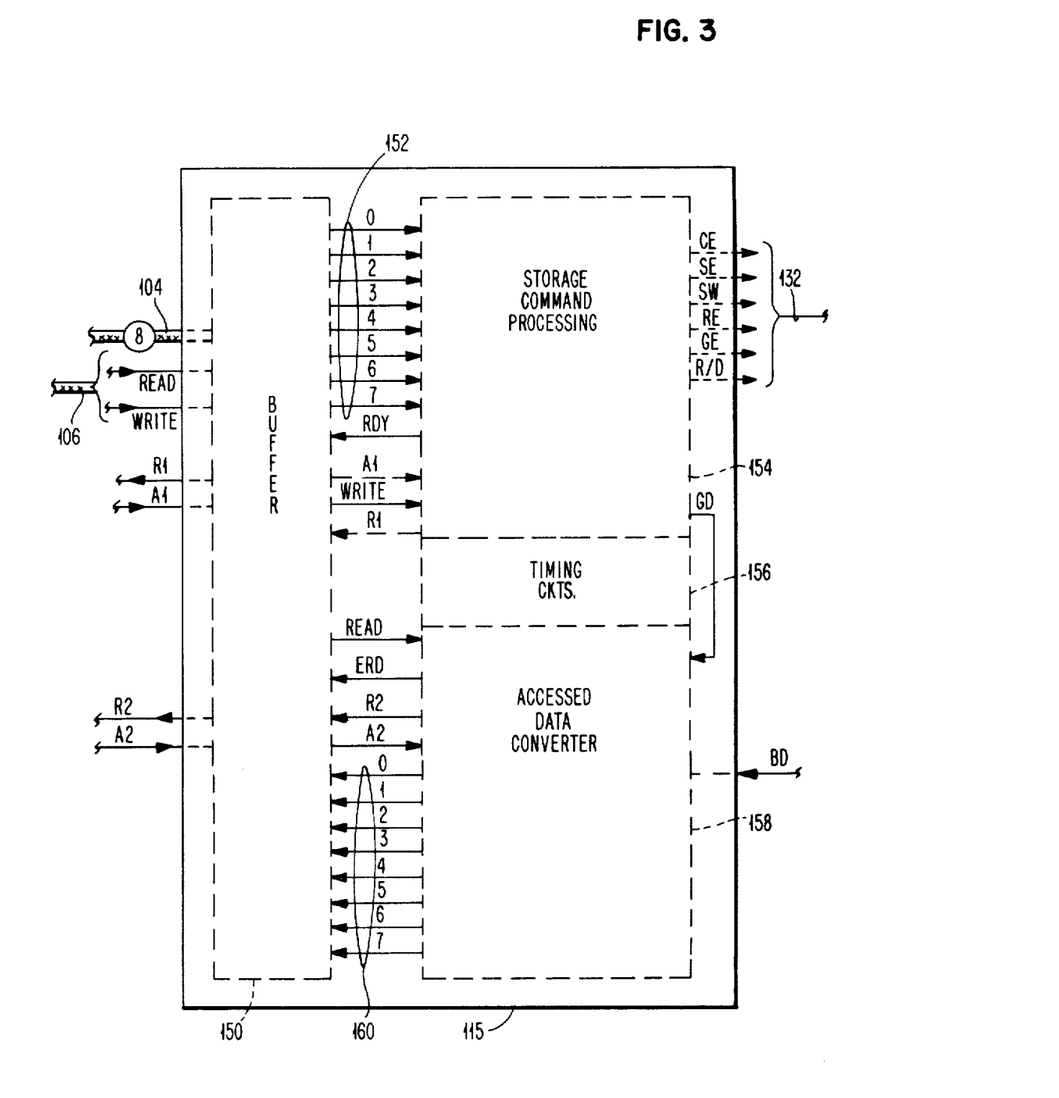
FIG. 3 is a diagram indicating functional sections of a signal interface according to the invention.

Referring to FIG. 3, the storage interface 115 can be thought of as including a buffer 150, a storage command processing circuit 154, a timing circuit 156, and an accessed data converter 158. The buffer 150 serves to isolate the magnetic bubble memory 8 from the signal lines of the computer system 100 (see also FIG. 2) to guard against noise transmission. After passing through the buffer 150, data from bus 104 is sent over lines 152 to storage command processing circuitry 154 that serves, as is discussed below, to latch the data bits for use as individual control signals. Timing signals for coordinating the data operations occurring within the storage interface 115 are produced by the timing circuit 156. Accessed data in the form of the signal BD from the sense amplifier is converted from serial to parallel form for transfer to the data bus 104 as is discussed more fully below.

Figure 4:
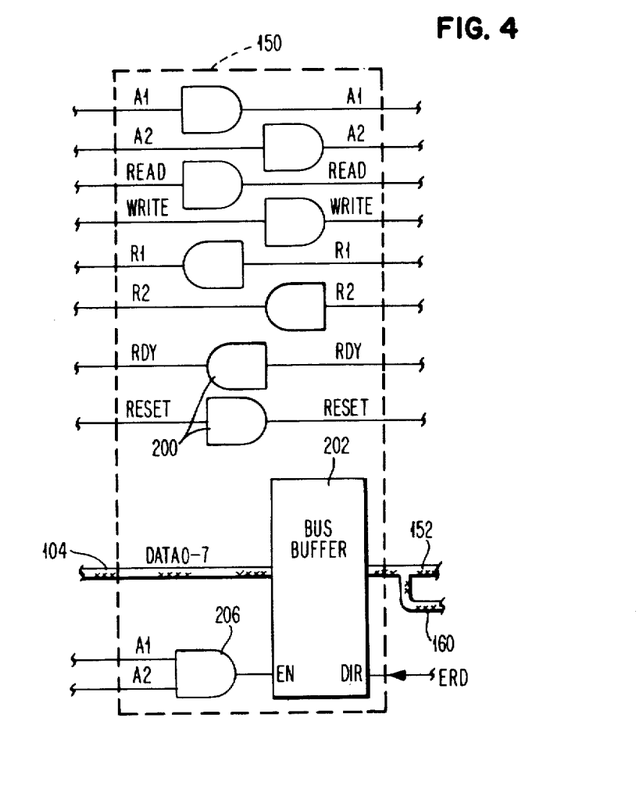
FIG. 4 is a diagram of a buffer for the interface of FIG. 3.

Referring to FIG. 4, the buffer 150 includes a series of AND gates 200 that serve to provide noise isolation for various control signals such as the request signals R1, R2 that are transmitted to the DMA device 114. The signals on lines 152 and 160 are isolated from the system 100 by a three-state bus buffer 202 that connects to the data bus 104. At the enable terminal of the buffer 202, a signal is applied from an AND gate 206 which receives the DMA acknowledge signals A1 and A2. At the direction terminal (DIR) of the buffer 202, the signal ERD is applied to indicate intervals when data is to be read from the accessed data converter 150, as is discussed below.

Figure 5:
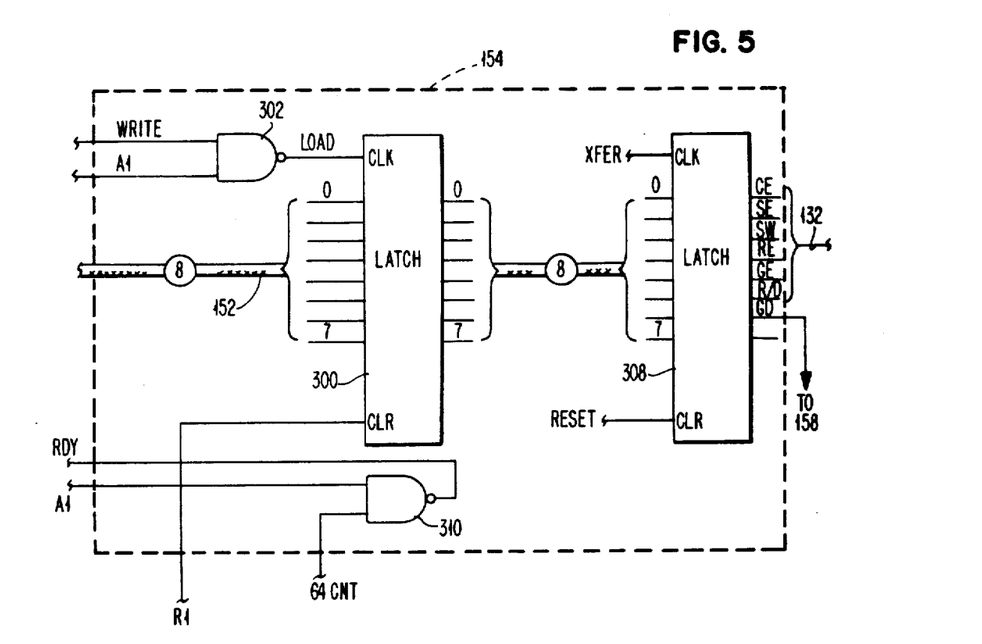
FIG. 5 is a diagram of a storage command processor for the interface of FIG. 3.
Figure 8:
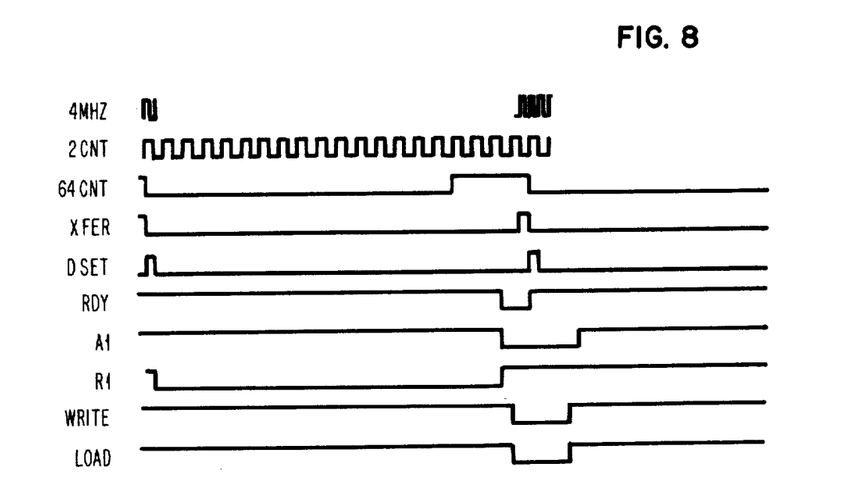
FIG. 8 is a series of waveform diagrams for signals relating to implementation of the invention.

Referring to FIG. 5, the presently preferred storage command processor 154 of the interface 115 (see FIG. 3) includes a first latch 300 that receives coded commands from the buffer 150 over the lines 152 and is clocked by the signal LOAD (see FIG. 8) produced by NAND gate 302 which receives the control signals, WRITE and the DMA acknowledge signal A1. Effectively, when both the signal WRITE and the signal A1 are high, the latch 300 retains the levels asserted at lines 152. The latch 300 is cleared by the DMA request signal R1 (discussed below).

Data from the latch 300 is sent to a second latch 308, under clocking control of the signal XFER (discussed below), which identifies an interval at the end of an operating cycle when the output of latch 300 is stable. The latch 308 supplies the data bits 0–5 as individual control signals to the function timing generator 130 over the lines 132.

Preferably, the 4-bit from the latch 308 corresponds to a coil enable signal CE for triggering a bubble advance and the 0-bit corresponds to a sense amplifier enable signal SE that triggers the enabling of the sense amplifier 30 to read data. The 2-bit preferably initiates a swap operation and the 3-bit a replicate operation. Using the 1-bit, a generate operation is initiated and the 6-bit serves to indicate if replicate and/or swap signals are intended for the loop 10' or the loops 10 (see FIG. 1). The 5-bit preferably indicates whether data at the read site is from one of the good loops of the set of loops 10.

Clearing of the latch 308 is effected by the signal RESET that originates from a system power on reset (not shown). A signal RDY is generated from the DMA acknowledge signal A1 and the signal 64 count (see FIG. 8) at a NAND gate 310. The RDY signal serves to prevent the DMA 114 from completing the data transfer on data bus 104 until the latch 308 has captured the coded command.

Figure 6:
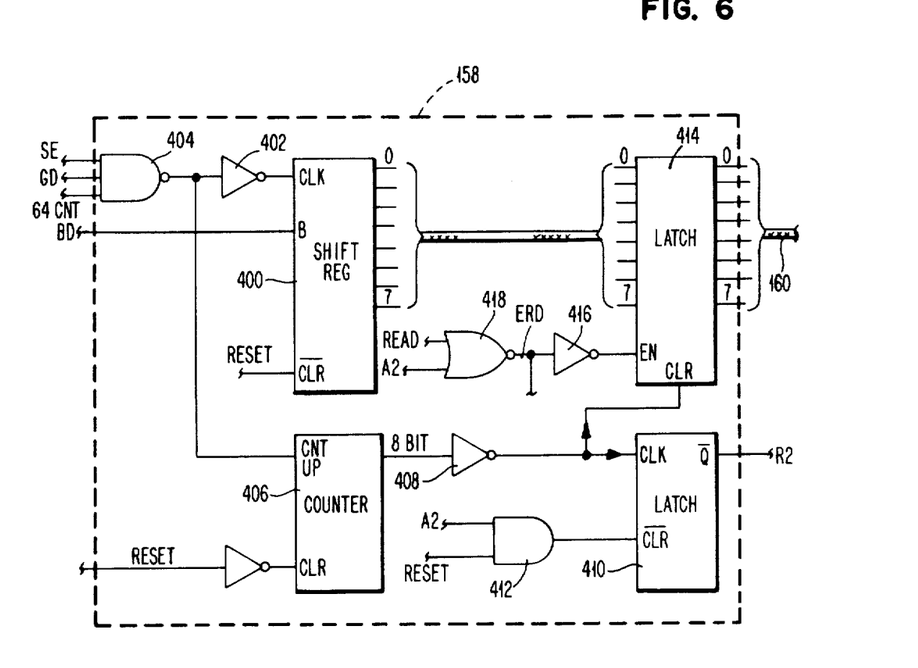
FIG. 6 is a diagram of an accessed data converter for the interface of FIG. 3.

Referring to FIG. 6, the accessed data converter 158 (shown reversed left-to-right from FIG. 3) includes a shift register 400 that receives the signal BD from the sense amplifier 30 (see FIG. 2). A clocking signal for shift register 400 is produced by inverting, at an inverter 402, the output of a NAND gate 404 that has inputs the signals SE which indicates the sense amplifier is enabled, GD which indicates the data is from a good loop, and 64 CNT which identifies a last portion of a memory cycle at which the output of the sense amplifier 30 is stable. Clearing of the shift register occurs under control of the signal RESET which originates from the system power on reset. The output of the NAND gate 404 is also applied to a counter 406 that counts the bits accumulated in the shift register 400 and provides an output logic signal 8 BIT at a count of eight. The inverse of the signal 8 BIT is produced by an inverter 408 and serves to clock a latch 410 that produces the request R2 for the DMA device 114. The signal R2, hence, serves to indicate that a word of data is ready for transfer to the RAM 112. Clearing of the latch 410 is effected by a signal from an AND gate 412 that receives the acknowledge signal A2 and the signal RESET.

The signal A2 and the control signal READ are applied at a NOR gate 418 to produce a signal ERD which is inverted at inverter 416 for application at the enable terminal of a latch 414 which captures the output of the shift register 400. The latch 414 is cleared by the output of the inverter, 408 and serves to hold an eight bit word of data accumulated at the shift register 400 for transfer to the system 100 under the control of the DMA device 114.

Figure 7:
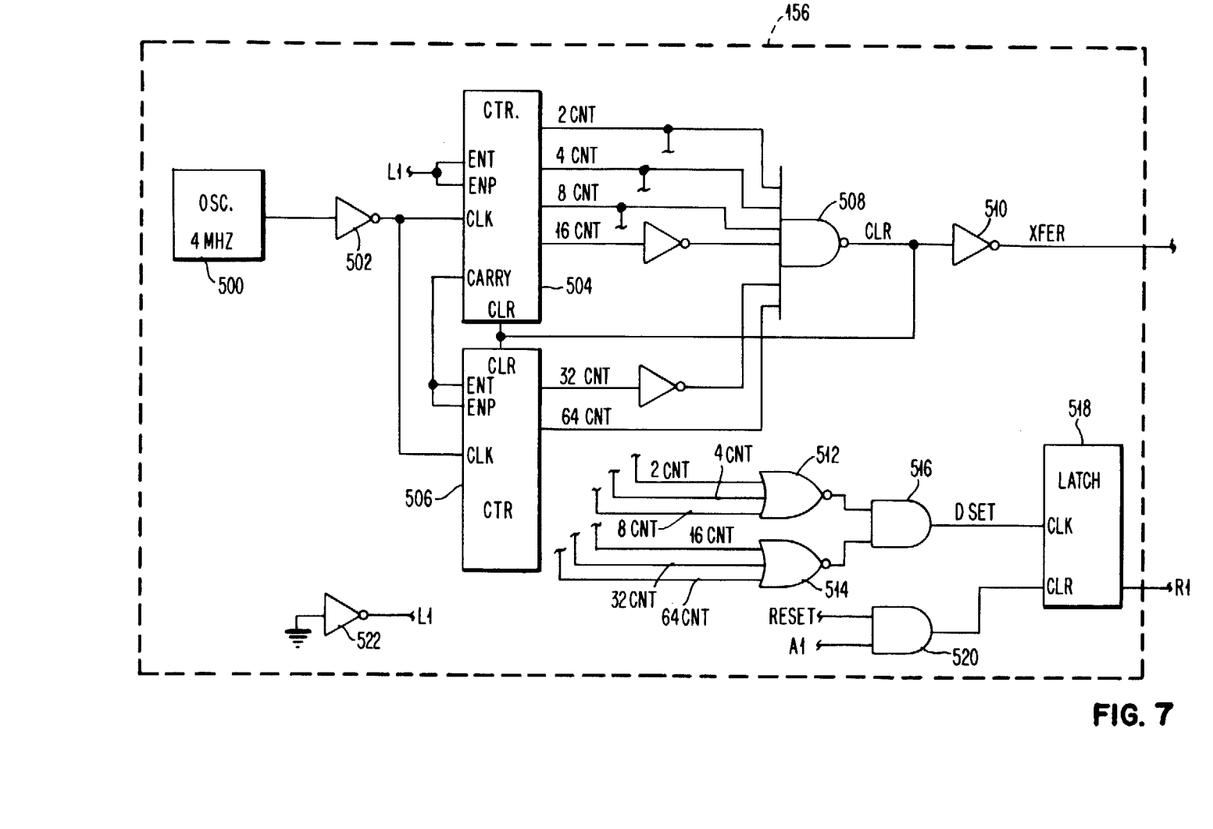
FIG. 7 is a diagram of a timing signal circuit for the interface of FIG. 3.

Referring to FIG. 7, the presently preferred timing circuit 156 of the storage interface 115 serves to produce the signal XFER and the request signal R1 for the DMA device 114 (see also FIG. 2), which signals coordinate transfers of command signals from the RAM 112. A signal from a four megahertz oscillator 500 is inverted by an inverter 502 which serves as a buffer. The inverted signal is applied to first and second counters 504 and 506. These counters are connected to count up to sixty four of the oscillations from the oscillator 500 and outputs are provided (2 cnt, 4 cnt, 8 cnt, 16 cnt, 32 cnt and 64 cnt) for the binary digits of the count total. A NAND gate 508 and an inverter 510 are connected in series and provide the signal XFER when the count total is at seventy-eight compared to an eighty total for a 10 microsecond storage period. At this time in a storage cycle, the latch 414 (FIG. 6) has a settled output representing a transferred command word and can be relied on during a latching operation. The output of the NAND gate 508 is used to clear the counters 504 and 506. The output signals of the counters 504 and 506 are also used to produce the signal DSET and the DMA request signal R1 (see FIG. 8) using NOR gates 512 and 514 in conjunction with an AND gate 516 to respond to a count of eighty. The DSET signal is latched to produce the signal R1 by a latch 518 that is cleared by the output signal of an AND gate 520 which receives the RESET signal and the signal A1 as inputs. The receiver 522 is used to generate a logic one signal L1.

Figure 9:
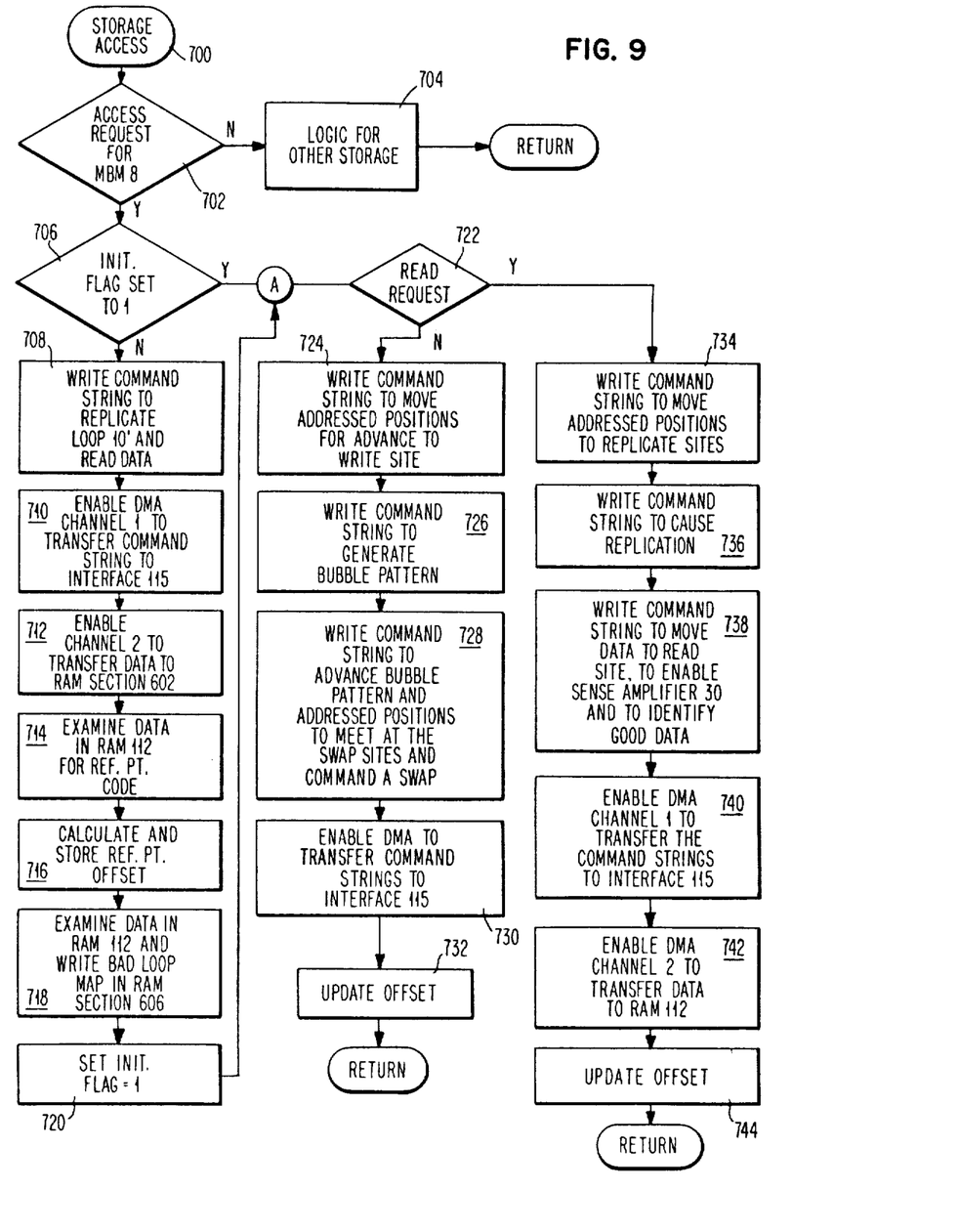
FIG. 9 is a flow diagram indicating logic operations permitting indirect control of a magnetic bubble memory according to the invention.

Referring to FIG. 9, command string generating logic for carrying out operation of processor 108 according to the invention may be structured into a section 600 of the ROS 110 (see also FIG. 2). The incidence of a storage access request causes entry of a storage access subroutine (block 700) and a test is performed (block 702) to determine if the storage access request relates to an address in an address range assigned to the magnetic bubble memory 8. If not, a transfer to logic for other storage occurs (block 704). Otherwise, a transfer occurs to a test of a flag INIT (block 706) that is set to zero when the system 100 is powered up to indicate an initialization of the magnetic bubble memory has not taken place. If no initialization has taken place, the processor 108 proceeds to write a string of command words (block 708) into the RAM 112 at section 124 to cause reading of the special loop 10' that includes bad loop and reference point information.

TABLE 1

| Bit | Function Represented |
|---|---|
| 0 | Enable Sense Amplifier 30 |
| 1 | Generate bubble |
| 2 | Swap (send signal S or S' depending on bit 6) |
| 3 | Replicate (send signal R or R' depending on bit 6) |
| 4 | Activate coils for advance |
| 5 | Bad loop data identifier (1 = bad loop) |
| 6 | 1 = special loop 10'; 0 = loops 10 |
| 7 | Extra bit |

If, as was discussed above, the command word bits have the significance indicated in Table 1, then a series of codes 1 1 0 1 1 0 0 0 is written to cause replication of redundancy loop 10' and advance the data stream on read channel 22 to the read position 26. Once the read position is reached (after N2+N4 command words), the code is changed to 0 1 1 1 1 0 0 1 to cause both replication and reading of data. Finally, when the full loop is replicated, the command word can be changed to 0 0 1 1 0 0 0 1 to read the data stream from the channel 22.

For some magnetic bubble memories, repeated replication may not be possible without danger of overheating. In such a situation, advance operations may be inserted for "padding" to allow for cooling. However, such insertion of advance operations affects the order of reading, the data and must, of course, be taken into consideration when interpreting the accessed data.

Once the command string is written into section 124 of the RAM 112, the processor 108 enables (block 710) the DMA device 114 to transfer the string to interface 115. The data generated in responding to the command string is transferred to a data section 602 of the RAM 112 by enabling (block 712) a second channel of the DMA device 114. When the DMA device signals the data transfers are completed over the interrupt line 122, the processor examines (block 714) the data at section 602 of RAM 112 to identify a special code identifying the reference point of the data stream for loop 10' (which identifies also corresponding points on the loop 10). With the end of the reference point code identified, the number of bubble stream advances is determined, for example, from the length of the data set at the section 602 of the RAM 112 to provide an offset number representing the shift of the reference point from the replicate site. The offset number is stored in a location 604 of the RAM 12 (block 716).

Finally, the data from loop 10' is examined (block 718) to produce a table or map of bad loops which, while occupying a loop position, are not used for storing data.

The bad loop table is stored in a section 606 of the RAM 112. With the initialization completed, the initialization flag is set (block 720) to permit subsequent transfer around the initialization logic and the logic transfers to branch point A.

From branch point A, a test is entered to determine whether a read or write operation is intended (block 722). If a write operation is intended, the logic flow transfers to a series of processing steps (blocks 724–732) for writing data to a selected set of addresses. First, a command word string is written (block 724) to the section 124 of the RAM 112 for moving the addressed data receiving bubble stream positions N1 locations ahead of the write sites (using command words with data bit 4 at logic 1).

A command string is then written (block 726) that generates bubbles in accordance with the data to be stored using commands of the form 0 0 0 1 0 0 X 0 (where the X represents a bit that is 0 or 1 according to the data). A "padding" command is included for positions corresponding to bad data loops as determined from the table stored in section 606 of the RAM 112.

A command string is then written (block 728) to shift the bubbles in the channel 16 to meet the addressed bubble stream positions at the swap sites using commands with bit 4 at logic 1 and a swap operation is commanded using a command with bit 2 at logic 1 and bit 6 at logic 0. With the command string in place in section 124 of the RAM 112, the DMA device 114 is enabled to effect the transfers to the interface 115 for processing thereby as was discussed above. Finally, the offset is updated (block 732) based on the total of the bubble stream shifts that were commanded to write data.

If the result of the test for a read request at block 722 is positive, the processor 108 writes (block 734) a command string to shift (bit 4=logic 1) the addressed bubble stream positions to the replicate sites based on the offset number stored in location 604 of the RAM 112. A command string to cause replications of the desired data to read channel 22 is then written (block 736) followed by commands (block 738) to shift (bit 4=logic 1) the replicated data to the read site and to enable (bit 0=logic 1) the sense amplifier 30. For commands enabling the sense amplifier 30, the bit 5 is set to logic 1 for good data and logic zero for bad loop data as determined from the bad loop table of section 606 of the RAM 112. It should be noted that, for the accessed data converter 158 (see FIG. 6) described above, multiples of eight bits must be read because an eight bit word is accumulated before the latch 410 sends out a DMA request signal R1. Once the command strings are stored in section 124 of the RAM 112, the DMA device 114 is enabled (block 740) to cause transfers to the interface 115 for processing. A second channel of the DMA is enabled to transfer data from the interface 115 to a section 602 of the RAM 112.

Finally, the offset is updated (block 744) respective of the number of shifts to the bubble stream that have been commanded.

As indicated above, the processor 108 is freed to do normal processing, while interaction with a magnetic bubble storage 8 occurs by virtue of using indirect control through coded command words.

The invention has been described in detail with reference to a presently preferred implementation thereof. However, variations will be suggested to those skilled in the art which are within the spirit and scope of the claimed invention. For example, the invention may be practiced with various storage devices where a series of basic commanded operation may be necessary to effect an access regarding a specific storage address. And, various approaches may be taken to establishing a code representation for commands according to the invention.

What is claimed is:

1. A control system for a magnetic bubble memory comprising:
   a main data processor for generating bubble memory control string coded binary words and for normal data processing functions;
   a direct-access data storage device, operative to receive coded binary words from said data processor,
   magnetic bubble memory apparatus including at least one stream of magnetic bubble data elements the state of each of which represents data that are arranged along one or more paths defining multiple data element receiving locations, said magnetic bubble apparatus including reading means, enabled by a first control signal, for producing a data signal indicative of said state of a magnetic bubble data element at a first predetermined data element receiving location,
   writing means for selectively generating a magnetic bubble, in accordance with a second control signal, for a data element located at a second predetermined data element receiving location, and
   advance means for incrementally advancing data elements along said path(s) responsive to a third control signal;

said main data processor having logic and control means to determine all strings of coded binary words including said control signals and to write said strings of coded binary words into said direct-access storage device for permitting indirect processor control of said bubble memory apparatus;

interface means for receiving and for decoding said coded binary words to produce corresponding control signals;

means for applying control signals produced at said interface means to said magnetic bubble apparatus; and a direct memory access device controllable by said processor for causing said strings of words to be transferred from said direct access storage device to said interface means to operate said magnetic bubble apparatus with control signals in selected combinations defined by said processor while said main processor conducts other data processing.

2. A data storage system according to claim 1 wherein said magnetic bubble apparatus includes plural loop paths in which magnetic bubble data elements circulate, a read path including said first predetermined data element receiving location, and replicate means responsive to a fourth control signal for replicating magnetic bubble data elements present at said first predetermined data element location of said loop paths onto said read path, and wherein said strings of words include said first, second, third, and fourth control signals.

3. A data storage system according to claim 2 wherein said magnetic bubble apparatus further includes a write path including second predetermined data element locations and means responsive to a fifth control signal to transfer magnetic bubble data elements from said write path to said loop paths, and wherein said strings of words include said first, second, third, fourth, and fifth control signals.

4. A data storage system according to claim 1 wherein said interface means further includes register means for receiving said data signal from said reading means, said register means including means for accumulating plural data signals for transmission to said data processing system in parallel.

5. A data storage system according to claim 4 wherein said register means includes a shift register that accumulates data signals, a counter that maintains a count of received data signals, and logic means coupled to said counter for generating a request signal to said direct memory access device when a predetermined count is achieved.

6. A data storage system according to claim 1 wherein particular bits of a word of said coded binary words correspond to respective of said control signals.

7. A control system for a magnetic bubble memory comprising:

a main data processor for generating bubble memory control string commands and for normal data processing functions, a direct-access memory in cooperation with said processor, a magnetic bubble memory system responsive to plural types of control signals to cause corresponding basic memory operations including advance of bubbles, generation of bubbles and production of a data signal according to the presence or absence of a bubble;

said main data processor having logic and control means to determine all strings of command words including said control signals and to write said strings of command words into said direct-access memory;

an interface device for latching command signals, for individually decoding latched command signals to produce corresponding control signals and for applying control signals to said magnetic bubble memory system; and direct memory access means for transferring said command words from said direct-access memory to said interface device as said command signals under the control of said processor to operate said magnetic bubble system with control signals in selected combinations defined by said processor while said main processor conducts other data processing.

8. A data processing system comprising:

a main data processor for generating bubble memory control string commands and for normal data processing functions, a direct-access storage connected to said processor by data, address and control busses, a magnetic bubble memory apparatus including plural loop paths for respective streams of magnetic bubble data elements and an adjacent read path and an adjacent write path for reading and writing data elements, there being means responsive to a first control signal for advancing bubble data elements on said loop paths, means responsive to a second control signal for producing a data signal in accordance with the data element at a location on said read path;

means responsive to a third control signal for generating a detectable bubble state for a magnetic bubble data element at a location on said write path;

swap means responsive to a fourth control signal for transferring data elements from said write path to aid loop paths and replicate means responsive to a fifth control signal for replicating data elements from said loop paths to said read path;

said main data processor having logic and control means to determine all strings of command signals including said control signals and to write said strings of command signals into said direct-access storage for permitting indirect processor control of said bubble memory;

interface means connected to said data bus for receiving and for converting said command signals to corresponding individual control signals which are supplied to said magnetic bubble memory apparatus; and a direct memory access device controlled by said processor for coordinating a one-at-a-time transfer of said command signals to said interface means to operate said magnetic bubble memory apparatus with control signals in selected combinations defined by said processor while said main processor conducts other data processing.

9. A data storage system according to claim 8 wherein said interface means further includes register means for receiving said data signal from said read path, said register means including means for accumulating plural data signals for transmission to said data processing system in parallel.

10. A data storage system according to claim 9 wherein said register means includes a shift register that accumulates data signals, a counter that maintains a count of received data signals, and logic means coupled to said counter for generating a request signal to said direct memory access device when a predetermined count is achieved.

* * * * *